US008850816B2

(12) United States Patent
North et al.

(10) Patent No.: US 8,850,816 B2
(45) Date of Patent: Oct. 7, 2014

(54) POWER REGENERATION FOR AN INFORMATION HANDLING SYSTEM

(75) Inventors: Travis Christian North, Pflugerville, TX (US); Andrew Olen Ingalls, Round Rock, TX (US); Eric Neil Sendelbach, Austin, TX (US); Manasi Tamhankar, Austin, TX (US); Srinivasan R. Kadathur, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 600 days.

(21) Appl. No.: 12/777,836

(22) Filed: May 11, 2010

(65) Prior Publication Data

US 2011/0277475 A1    Nov. 17, 2011

(51) Int. Cl.
*F01K 13/00*  (2006.01)
*F01K 11/00*  (2006.01)
*F01K 23/10*  (2006.01)
*F01K 25/08*  (2006.01)
*F01K 23/06*  (2006.01)
*F01K 25/00*  (2006.01)
*F01K 15/00*  (2006.01)
*G06F 1/20*   (2006.01)
*F01K 11/02*  (2006.01)

(52) U.S. Cl.
CPC ............ *G06F 1/20* (2013.01); *G06F 2200/201* (2013.01); *F01K 15/00* (2013.01); *F01K 11/02* (2013.01)
USPC ................... 60/645; 60/618; 60/651; 60/669; 60/670; 60/671

(58) Field of Classification Search
USPC ........... 60/651, 671, 645, 618, 670, 669, 649, 60/657; 165/104.25; 290/1 R; 361/699, 361/700
See application file for complete search history.

(56) References Cited

U.S. PATENT DOCUMENTS

| 2,079,118 | A | * | 5/1937 | Hingst | 60/669 |
|---|---|---|---|---|---|
| 2,707,863 | A | * | 5/1955 | Rhodes | 60/669 |
| 2,767,549 | A | * | 10/1956 | Martin | 60/669 |
| 3,048,982 | A | * | 8/1962 | Geiger | 60/670 |
| 3,260,050 | A | * | 7/1966 | Anderson | 60/669 |
| 3,293,851 | A | * | 12/1966 | Hulbert et al. | 60/669 |
| 3,447,314 | A | * | 6/1969 | Majkrzak | 60/657 |
| 4,106,294 | A | * | 8/1978 | Czaja | 60/649 |
| 4,471,621 | A | * | 9/1984 | Amir et al. | 60/669 |
| 4,546,608 | A |  | 10/1985 | Shiina et al. | 60/649 |
| 5,390,077 | A | * | 2/1995 | Paterson | 361/700 |
| 6,377,458 | B1 | * | 4/2002 | Morris et al. | 361/699 |
| 6,549,408 | B2 | * | 4/2003 | Berchowitz | 361/700 |
| 6,574,963 | B1 | * | 6/2003 | Tadayon et al. | 60/651 |

(Continued)

*Primary Examiner* — Kenneth Bomberg
*Assistant Examiner* — Daniel Wagnitz
(74) *Attorney, Agent, or Firm* — Baker Botts L.L.P.

(57) ABSTRACT

The present disclosure includes a method for regenerating power in an information handling system. The method includes circulating a cooling fluid through a fluid flow loop connecting a thermosiphon, a turbine, and a condenser. The method further includes removing heat from a heated component of the information handling system, converting the cooling fluid from a liquid state to a gaseous state in the thermosiphon, and extracting energy from the cooling fluid in the gaseous state in the turbine. The method additionally includes removing thermal energy from the cooling fluid in the condenser, converting the cooling fluid from a gaseous state to a liquid state as the thermal energy is removed from the cooling fluid, and returning the cooling fluid in the liquid state to the thermosiphon. The disclosure also includes associated systems and apparatuses.

20 Claims, 4 Drawing Sheets

(56) References Cited

U.S. PATENT DOCUMENTS

| | | | |
|---|---|---|---|
| 6,681,576 B1* | 1/2004 | Abe | 60/645 |
| 6,714,413 B1 | 3/2004 | Ghosh et al. | 361/700 |
| 6,834,713 B2 | 12/2004 | Ghosh et al. | 165/104.33 |
| 6,877,318 B2* | 4/2005 | Tadayon et al. | 60/651 |
| 6,894,899 B2* | 5/2005 | Wu et al. | 361/699 |
| 7,081,686 B2* | 7/2006 | Yang | 60/671 |
| 7,096,928 B2 | 8/2006 | Phillips et al. | 165/104.21 |
| 7,204,299 B2* | 4/2007 | Bhatti et al. | 361/699 |
| 7,411,337 B2* | 8/2008 | Tadayon et al. | 310/339 |
| 7,532,467 B2* | 5/2009 | Launay et al. | 361/699 |
| 8,422,218 B2* | 4/2013 | Fried et al. | 361/700 |
| 8,619,426 B2* | 12/2013 | Chamseddine et al. | 361/700 |
| 8,644,020 B2* | 2/2014 | Lau et al. | 361/700 |
| 2003/0192314 A1* | 10/2003 | Tadayon et al. | 60/651 |
| 2004/0052048 A1* | 3/2004 | Wu et al. | 361/699 |
| 2004/0052049 A1* | 3/2004 | Wu et al. | 361/699 |
| 2004/0221579 A1* | 11/2004 | Baker | 60/670 |
| 2006/0065386 A1* | 3/2006 | Alam | 361/700 |
| 2006/0162898 A1* | 7/2006 | Reyzin et al. | 361/700 |
| 2006/0162903 A1* | 7/2006 | Bhatti et al. | 361/700 |
| 2006/0283579 A1* | 12/2006 | Ghosh et al. | 361/700 |
| 2007/0035927 A1* | 2/2007 | Erturk et al. | 361/700 |
| 2007/0144707 A1* | 6/2007 | Bhatti et al. | 361/699 |
| 2007/0246195 A1* | 10/2007 | Bhatti et al. | 361/700 |
| 2007/0267182 A1* | 11/2007 | Rusch et al. | 361/700 |
| 2007/0284093 A1* | 12/2007 | Bhatti et al. | 361/700 |
| 2008/0116694 A1* | 5/2008 | Hendershot | 290/1 R |
| 2009/0242174 A1* | 10/2009 | McCutchen et al. | 165/104.25 |
| 2010/0229552 A1* | 9/2010 | Baune et al. | 60/645 |
| 2011/0083436 A1* | 4/2011 | White et al. | 60/670 |
| 2013/0301214 A1* | 11/2013 | Bohm et al. | 361/700 |

* cited by examiner

POWER REGENERATION FOR AN INFORMATION HANDLING SYSTEM

TECHNICAL FIELD

The present disclosure relates in general to information handling systems, and more particularly to power regeneration for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more microprocessors or other electronic components configured to perform the functions of a central processing unit (CPU). One or more heat sinks may be associated with an electronic component to increase the effective thermal mass and heat dissipation associated with the component. Electronics designers and users may find that a greater cooling rate allows increased operating speeds of the components so cooled. Some benefits of increased operating speeds may include, for example, an increase in how quickly and/or efficiently information may be processed, stored, and/or communicated.

FIG. 1 illustrates the use of a prior art heat sink 14 that may be used to increase the rate of heat transfer away from an electronic component associated with an information handling system. Electronic component 10 may include processing resources (e.g., one or more central processing units, a graphics processing unit, and/or a digital signal processor), storage units (e.g., a hard disk drive, flash memory, etc.), and/or any device configured to control data, to process data, to convert electric power (e.g., sensors, transducers, and actuators), and/or to distribute electric power.

Electronic component 10 includes pins 12 providing an electrical connection between electronic component 10 and the circuitry present on an associated circuit board. For example, pins 12 may include a connector configured to attach electronic component 10 to a CPU socket and/or CPU slot (e.g., to plug into a known "socket 478", "socket T", or any of the many CPU sockets provided to interface with one or more available CPUs). As another example, pins 12 may include a ball grid array (e.g., a fine ball grid array, a plastic ball grid array, a land grid array, a pin grid array, a dual in-line surface mount, and/or any other method of providing electrical connections to electronic component 10).

Heat sink 14 includes a mass 16 and a set of fins 18. Mass 16 is formed from an appropriate material with relatively high thermal conductivity (e.g., a metal block or aluminum and/or copper alloy). Fins 18 increase the surface area of heat sink 14 and, therefore, increase the rate of heat transfer through convection, conduction, and/or radiation between mass 16 and the environment. Extended Fins 18 define a primary flow direction, shown by arrow 20. In most information handling systems, the cooling fluid is room air drawn across fins 18 by a fan mounted in the case of the system.

The heat transfer from electronic component 10, mass 16, and/or fins 18 depends on the velocity of the cooling fluid, the specific heat of the cooling fluid, the surface area of fins 18, and the temperature difference between the cooling fluids and electronic component 10, mass 16, and/or fins 18. The heat removed from electronic component 10 is generally rejected to room air by the action of the fan, raising the cooling load in the surrounding air.

SUMMARY

In accordance with one embodiment of the present disclosure, an power regeneration system for use with an information handling system is disclosed. The power regeneration system may include a thermosiphon in thermal communication with a heated component of the information handling system, a turbine, a condenser, and a fluid flow loop. The thermosiphon may be configured to convert a cooling fluid from a liquid to a gaseous state as the cooling fluid absorbs heat from the heated component of the information handling system. The turbine may be configured to extract energy from the cooling fluid in the gaseous state after it leaves the thermosiphon. The condenser may be configured to remove thermal energy from the cooling fluid after it leaves the turbine, the condenser fluid converting the cooling fluid from a gaseous state to a liquid state as thermal energy is removed. The fluid flow loop may connect the thermosiphon, the turbine, and the condenser in order so that the cooling fluid flows in a closed loop through the power regeneration system.

In accordance with another embodiment of the present disclosure, an information handling system is disclosed. The information handling system may include a processor, a memory communicatively coupled to the processor, and a thermosiphon in thermal communication with the one or more processors, a turbine, a condenser, and a fluid flow path. The thermosiphon may be configured to convert a cooling fluid from a liquid to a gaseous state as the cooling fluid absorbs heat from the one or more processors. The turbine may be configured to extract energy from the cooling fluid in the gaseous state after it leaves the thermosiphon. The condenser may be configured to remove thermal energy from the cooling fluid after it leaves the turbine. The condenser may convert the cooling fluid from a gaseous state to a liquid state as thermal energy is removed. The fluid flow path may connect the thermosiphon, the turbine, and the condenser in order so that the cooling fluid flows in a closed loop through the power regeneration system.

In accordance with yet another embodiment of the present disclosure, a method for power regeneration in an information handling system is disclosed. The method may include circulating a cooling fluid through a fluid flow loop connecting a thermosiphon, a turbine, and a condenser, removing heat from a heated component of the information handling system, converting the cooling fluid from a liquid state to a gaseous state in the thermosiphon, extracting energy from the cooling fluid in the gaseous state in the turbine, removing thermal energy from the cooling fluid in the condenser, converting the cooling fluid from a gaseous state to a liquid state as the thermal energy is removed from the cooling fluid, and returning the cooling fluid in the liquid state to the thermosiphon.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 2 through 5, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Figure 1:
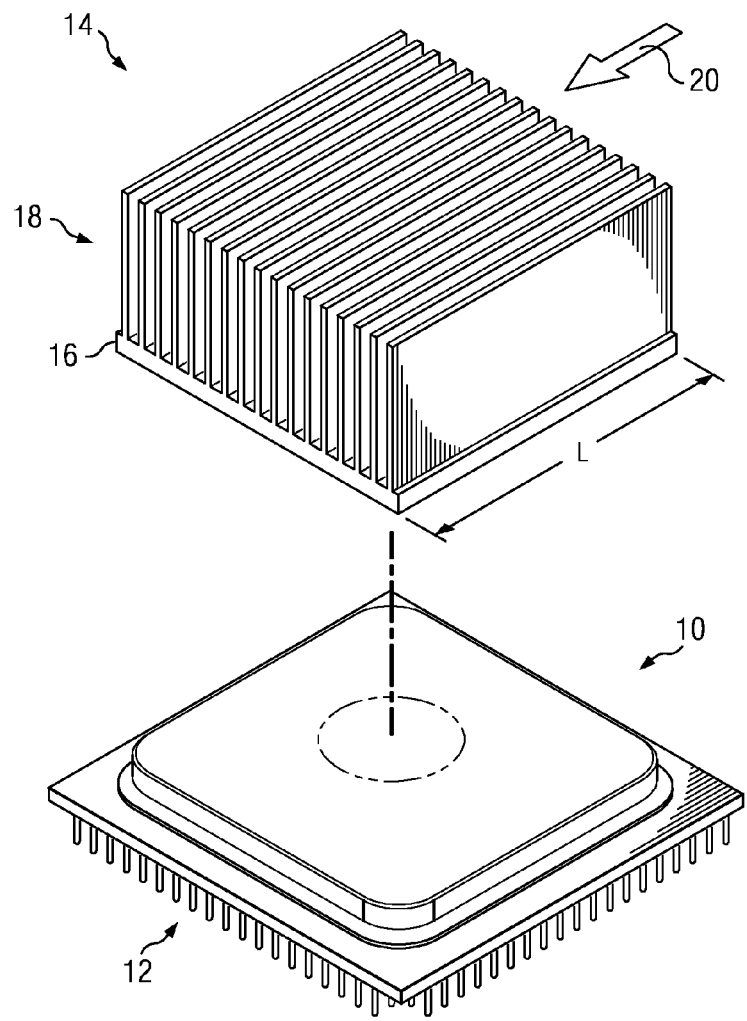
FIG. 1 illustrates a prior art heat sink for increasing the rate of cooling for an electronic component in an information handling system.
Figure 2:
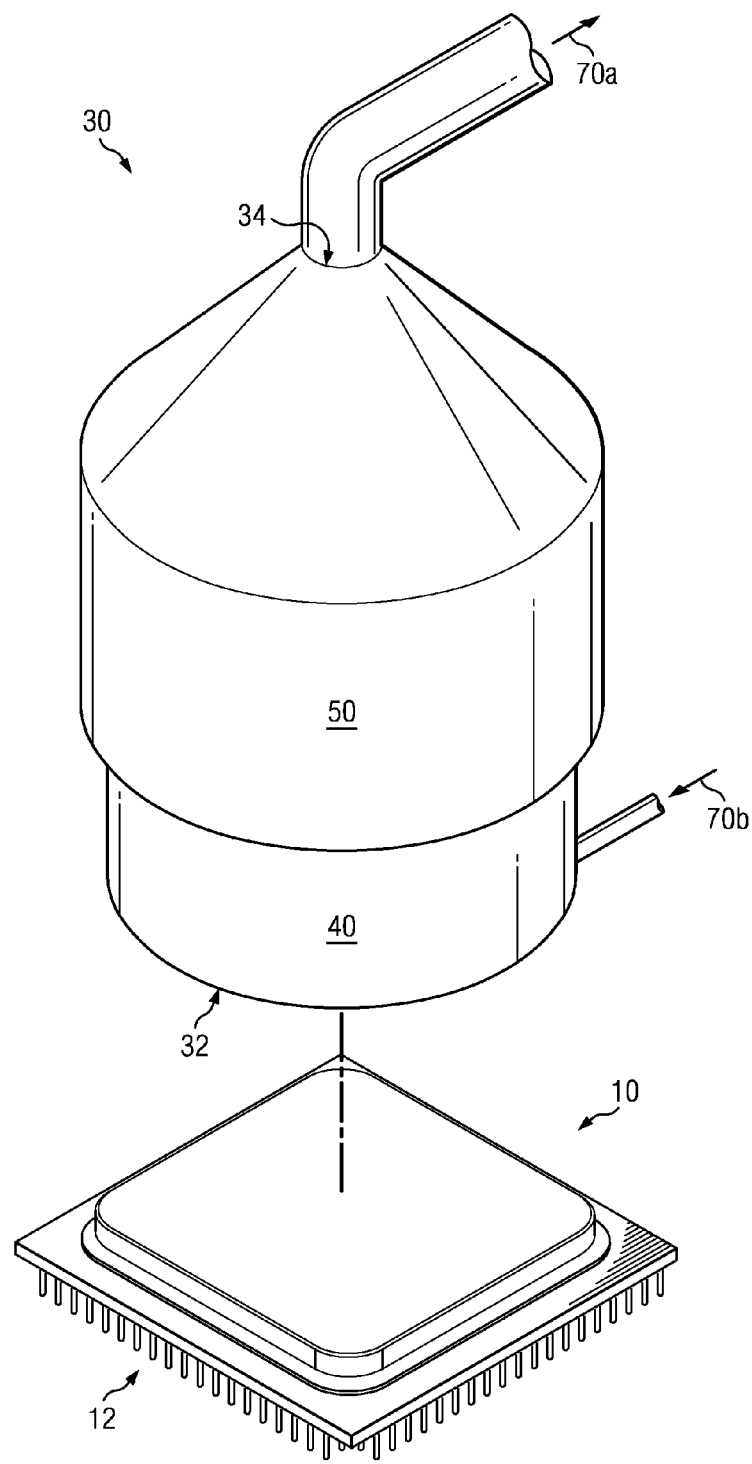
FIG. 2 illustrates a portion of an example power regeneration loop for use with an information handling system, in accordance with teachings of the present disclosure.

FIG. 2 illustrates a portion of an example power regeneration system 30 for use with an information handling system, in accordance with teachings of the present disclosure. Power regeneration system 30 may be mounted, as shown in FIG. 2, in association with an electronic component 10 of the information handling system. Power regeneration system 30 may be configured to remove heat from electronic component 10 using a cooling fluid entering at point 70b and exiting at point 70a. Electronic component 10 may include processing resources (e.g., one or more central processing units, a graphics processing unit, and/or a digital signal processor), storage units (e.g., a hard disk drive, flash memory, etc.), and/or any device configured to control data, to process data, to convert electric power (e.g., sensors, transducers, and actuators), and/or to distribute electric power.

Electronic component 10 may include pins 12 providing an electrical connection between electronic component 10 and the circuitry present on an associated circuit board. For example, pins 12 may include a connector configured to attach electronic component 10 to a CPU socket and/or CPU slot (e.g., to plug into a known "socket 478", "socket T", or any of the many CPU sockets provided to interface with one or more available CPUs). As another example, pins 12 may include a ball grid array (e.g., a fine ball grid array, a plastic ball grid array, a land grid array, a pin grid array, a dual in-line surface mount, and/or any other method of providing electrical connections to electronic component 10).

Power regeneration system 30 may include a thermosiphon 40 and a turbine 50. Thermosiphon 40 may include any component, device, and/or subsystem of the information handling system configured to circulate the cooling fluid from point 70b to point 70a using the heat removed from electronic component 10 rather than an associated mechanical pump. For example, thermosiphon 40 may allow convective movement of the cooling fluid. In such embodiments, cooling fluid at the bottom 32 of thermosiphon 40 may absorb the heat transferred from electronic component 10. As the cooling fluid heats up, it expands and its density reduces. Convection acts to move the heated cooling fluid upward and allows cooler liquid to settle at the bottom 32 of the thermosiphon 40.

As shown in FIG. 2, thermosiphon 40 may receive a cooling fluid at point 70b, entering at the bottom 32 of power regeneration system 30. As heat is transferred from electronic component 10 into thermosiphon 40, that cooling fluid may heat up and rise within Power regeneration system 30. If the cooling fluid heats up enough, it rises from thermosiphon 40 through turbine 50 and exits turbine 50 at point 70a.

Figure 3:
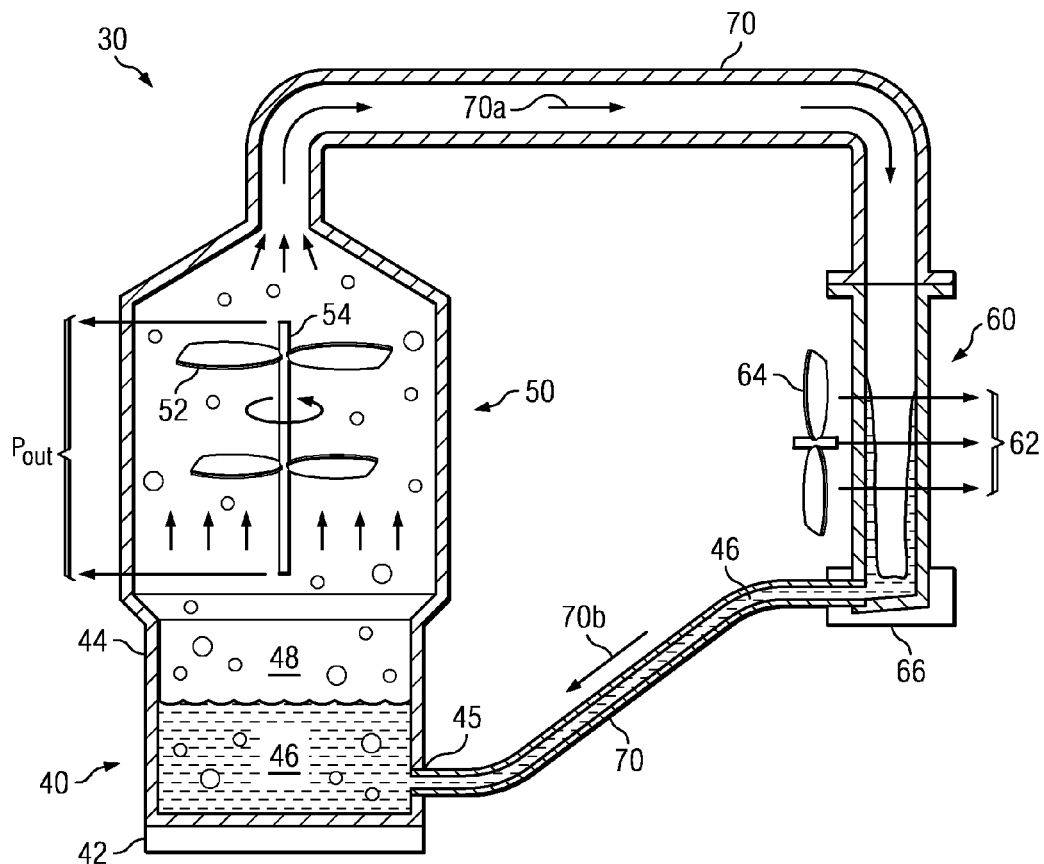
FIG. 3 shows a cross-section of the power regeneration system of FIG. 2, in accordance with teachings of the present disclosure.

FIG. 3 is a cross-section of power regeneration system 30. Power regeneration system 30 may include thermosiphon 40, turbine 50, condenser 60, and fluid flow loop 70. The circulation of a cooling fluid through power regeneration system 30 may depend on the effects of convection described in relation to FIG. 2. In embodiments depending on convective fluid flow, condenser 60 must be physically located above the inlet 45 of thermosiphon 40 so that condensing cooling fluid may return to thermosiphon 40 by the effects of gravity.

Thermosiphon 40 may include a boiling plate 42 and a reservoir 44. Boiling plate 42 may be direct thermal communication with electronic component 10 (as shown in FIG. 2). Boiling plate 42 may be any device, component, and/or feature of thermosiphon 40 configured to transfer heat from electronic component 10 into the cooling fluid in reservoir 44. For example, boiling plate 42 may include a plate of material with high thermal conductivity (e.g., copper) configured to match the shape of electronic component 10. In some embodiments, boiling plate 42 may include a cutout or indentation configured to rest on top of electronic component 10. In some embodiments, boiling plate 42 may be configured to collect heat from a plurality of heat sources associated with the information handling system. For example, multiple processors may share a cooling loop which feeds into plate in contact with boiling plate 42.

Reservoir 44 may include a portion of thermosiphon 40 configured to hold the cooling fluid in thermal communication with boiling plate 42. The cooling fluid may enter the reservoir at inlet 45 and collect at the bottom of reservoir 44 adjacent boiling plate 42. As shown in FIG. 3, the cooling fluid may enter reservoir 44 in a liquid phase 46. The cooling fluid may undergo phase transformation as heat is added, resulting in boiling and changing the cooling fluid into a gaseous phase 48. Because the gaseous phase 48 has a lower density than the liquid phase 46, bubbles will form adjacent boiling plate 42 and rise to the top of reservoir 44.

Turbine 50 may include any component, device, and/or feature of power regeneration system 30 configured to remove energy from a fluid passing through turbine 50. For example, turbine 50 may include a rotor assembly 54 with blades 52 mounted thereon. In such embodiments, the passage of the cooling fluid in its gaseous state through turbine 50 may cause rotor assembly 54 to rotate. The rotational energy of rotor assembly 54 may be converted into electrical power and/or used as rotational energy as needed. Rotor assembly 54 of FIG. 3 may be mounted vertically so that the cooling fluid rising from thermosiphon 40 will pass over blades 52.

In some embodiments, turbine 50 may be configured based on the properties of the cooling fluid used in power regeneration system 30. For example, blades 52 may have an increased lifetime if they are not subject to impact from liquid. If turbine 50 is designed to operate at a relatively high speed with a relatively low pressure drop, the cooling fluid may pass over blades 52 without condensing into its liquid phase. In such embodiments, the cooling fluid may leave turbine 50 still in a completely gaseous state at point 70a.

The cooling fluid may continue along fluid flow loop 70 in its gaseous state and eventually reach condenser 60. Condenser 60 may include any device, component, and/or feature of power regeneration system 30 configured to remove heat from the cooling fluid until it condenses into a liquid phase. For example, condenser 60 may include a radiator. In one embodiment condenser 60 may include a microchannel tube heat exchanger with fins configured to maximize the ratio of surface area on the fins to the volume of the heat exchanger. Power regeneration system 30 may include a fan 64 disposed to induce air flow 62 across condenser 60.

As the cooling fluid condenses to the liquid phase 46, the effect of gravity will draw the cooling fluid to the bottom 66 of condenser 60. If condenser 60 is physically above the inlet 45 of reservoir 44, cooling fluid will flow through fluid flow loop 70 at point 70b from condenser 60 to reservoir 44. Fluid flow loop 70 may include any conduit, tubing, and/or channel configured to transport the liquid cooling fluid 46 from condenser 60 to reservoir 44 and the gaseous phase 48 cooling fluid from turbine 50 to condenser 60.

The phase change properties of the cooling fluid may be chosen to match the configuration of power regeneration system 30. The selection of a cooling fluid may drive the configuration of turbine 50. For example, the change in boiling point of the cooling fluid based on the pressure drop (e.g., as it passes through turbine 50) may control whether the cooling fluid condenses within turbine 50. In some embodiments, the cooling fluid may stay in a fully gaseous state until after it has fully passed through turbine 50.

For example, one embodiment may use 3M NOVEC 7000 Engineered Fluid as the cooling fluid because it may include good dielectric properties, flammability, corrosive effects, and/or toxicity in the event of leakage. 3M NOVEC 7000 Engineered Fluid may allow boiling at ambient and/or near-ambient temperatures.

Figure 4:
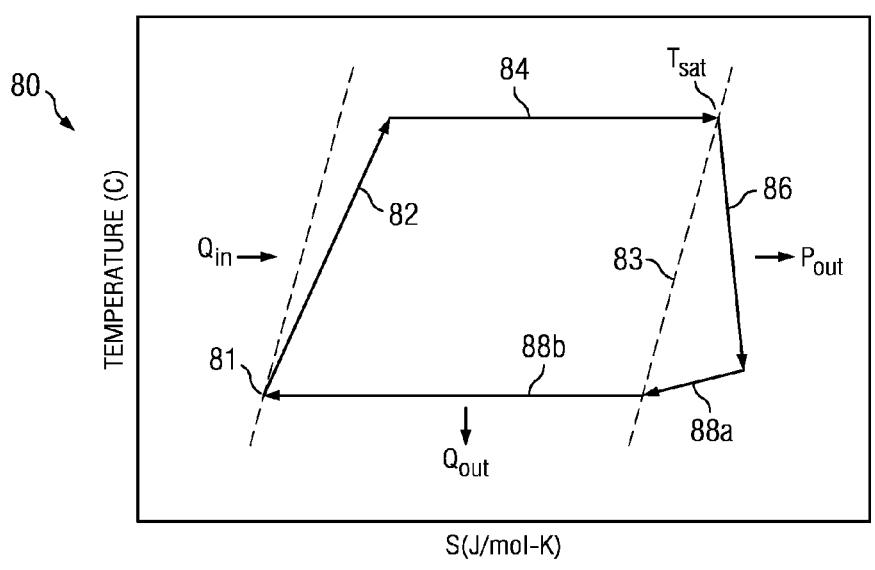
FIG. 4 is chart of temperature versus entropy showing an example cooling cycle that may be used in a power regeneration system for use with an information handling system, in accordance with teachings of the present disclosure.

FIG. 4 is chart of temperature versus entropy showing an example cooling cycle 80 that may be used in power regeneration system 30, in accordance with teachings of the present disclosure. As shown in FIG. 4, cycle 80 begins at point 81. In practice, however, cycle 80 may be a continuous cycle with no particular starting point.

Heat ($Q_{in}$) is added to the cooling fluid along legs 82 and 84 of cycle 80. Leg 84 shows the cooling fluid boiling (e.g., transforming from a liquid to a gaseous state at a constant temperature). Legs 82 and 84 of cycle 80 may take place within thermosiphon 40. At the end of leg 84, the cooling fluid may have reached a fully saturated gaseous state.

During leg 86, energy is removed from the cooling fluid (e.g., while passing through turbine 50). As shown in FIG. 4, cycle 80 is designed so that, even as the cooling fluid drops in temperature, it stays above line 83, indicating the condensation point as enthalpy varies. During leg 88a, the cooling fluid continues to reduce temperature, until it reaches the condensation point at the beginning of leg 88b. During leg 88b (e.g., in condenser 60), additional heat is removed from the cooling fluid until it reaches a fully condensed state and the cycle begins again at point 81. In one embodiment, power regeneration system 30 may be used in association with an electronic processor generating 100 watts of heat. If the temperature gradient between the entrance to turbine 50 and the exit of turbine 50 is 6 degrees Celsius, 11.3 watts of energy can be gathered from turbine 50.

The energy recovered by power regeneration system 30 may be used for any of several purposes. For example, many information handling systems include a powered cooling system to maintain the temperature of certain components within an acceptable range. Power regeneration system 30 may use the regenerated power to drive fan 64, reducing and/or eliminating the need to supply additional power for cooling.

In another example, the energy regenerated by power regeneration system 30 may be used to increase the total power available to the information handling system. For example, if a power supply associated with an information handling system supplies 1.2 kilowatts of energy, the addition of the energy regenerated by power regeneration system 30 may increase the total available energy to 1.4 kilowatts. In another example, the energy regenerated by power regeneration system 30 may provide auxiliary power for other components of the information handling system (e.g., external hard drives, racks, memory, CPUs, graphics cards, and/or any integrated circuit component associated with the information handling system).

In other embodiments, the energy regenerated by power regeneration system 30 may improve the acoustic performance and/or the thermal performance of the information handling system. Because some of the heat generated by electronic component 10 may be converted to energy rather than ejected from the information handling system as heat, the cooling load of the information handling system may be reduced. A reduced cooling load may result in lower noise generation (e.g., if fans are run at a lower speed and/or reduced in size), and/or a lower temperature external to the information handling system (e.g., less heat transferred to the surrounding space).

Figure 5:
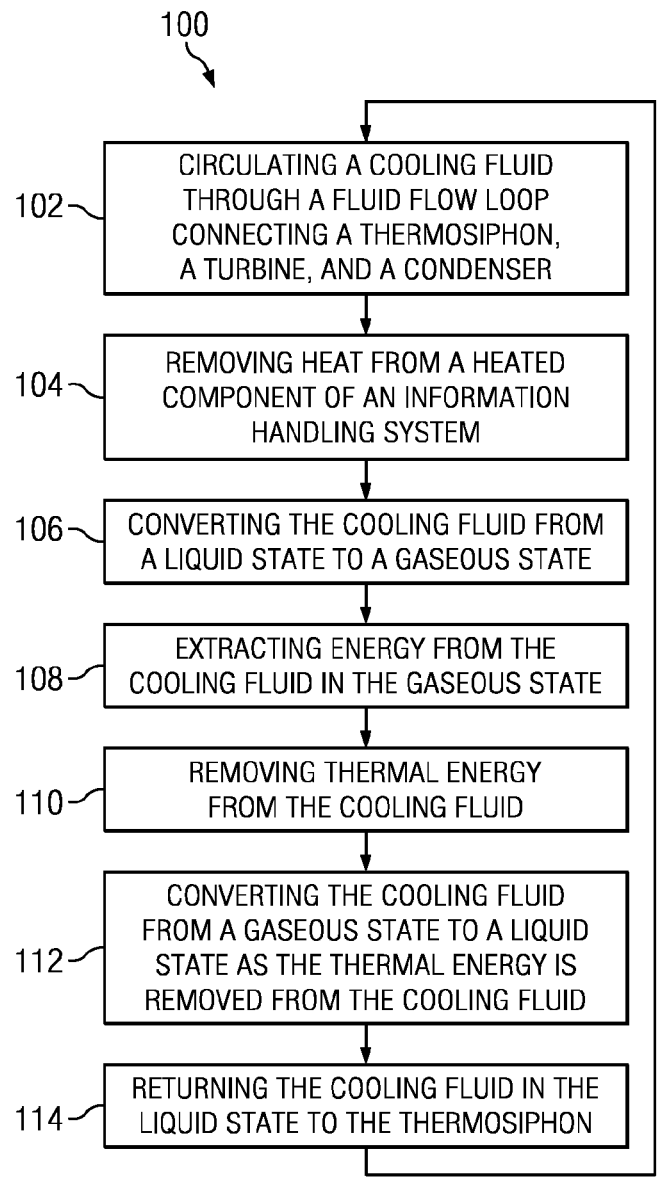
FIG. 5 illustrates an example method for regenerating power in an information handling system, in accordance with teachings of the present disclosure.

FIG. 5 illustrates an example method 100 for regenerating power in an information handling system, in accordance with teachings of the present disclosure. Although method 100 is discussed herein as beginning at step 102, method 100 may include a continuous loop which may begin at any step.

At step 102, a power regeneration system may circulate a cooling fluid through a fluid flow loop connecting a thermosiphon, a turbine, and a condenser. The fluid flow loop may include fluid flow loop 70.

At step 104, a power regeneration system may remove heat from a heated component of an information handling system. Thermosiphon 40 may perform step 104.

At step 106, a power regeneration system may convert the cooling fluid from a liquid state to a gaseous state. Step 106 may take place within reservoir 44.

At step 108, a power regeneration system may extract energy from the cooling fluid in the gaseous state. Turbine 50 may perform step 108.

At step 110, a power regeneration system may remove thermal energy from the cooling fluid. Condenser 60 and associated fan 64 may perform step 110.

At step 112, a power regeneration system may convert the cooling fluid from a gaseous state to a liquid state as the thermal energy is removed from the cooling fluid. Condenser 60 may perform step 112.

At step 114, a power regeneration system may return the cooling fluid in the liquid state to the thermosiphon. Fluid flow loop 70 may use the effects of gravity to perform step 114.

Although the figures and embodiments disclosed herein have been described with respect to display screens for information handling systems, it should be understood that various changes, substitutions and alternations can be made herein without departing from the spirit and scope of the disclosure as illustrated by the following claims.

What is claimed is:

1. A power regeneration system for use with an information handling system, the power regeneration system comprising:
   a thermosiphon disposed in a chamber and in thermal communication with a heated component of the information handling system, the thermosiphon configured to convert a cooling fluid from a liquid to a gaseous state as the cooling fluid absorbs heat from the heated component of the information handling system, the thermosiphon including a reservoir of the cooling fluid in the liquid state;
   a turbine disposed in the chamber with the thermosiphon and configured to extract energy from the cooling fluid in the gaseous state after it leaves the thermosiphon, the turbine located directly above and separate from the reservoir of the cooling fluid;
   a condenser configured to remove thermal energy from the cooling fluid after it leaves the turbine, the condenser converting the cooling fluid from a gaseous state to a liquid state as thermal energy is removed; and
   a fluid flow loop connecting the thermosiphon, the turbine, and the condenser in order so that the cooling fluid flows in a closed loop through the power regeneration system, wherein the turbine and the thermosiphon are vertically aligned and the condenser is offset from the turbine and thermosiphon.

2. A power regeneration system according to claim 1, wherein the condenser is a radiator.

3. A power regeneration system according to claim 1, further comprising a fan associated with the condenser and wherein the condenser is a radiator.

4. A power regeneration system according to claim 1, wherein a pressure drop of the cooling fluid as it passes through the turbine is small enough so that the fluid remains in the gaseous state until after it exits the turbine.

5. A power regeneration system according to claim 1, wherein the heated component of the information handling system comprises a boiling plate, the reservoir of the cooling fluid disposed above the boiling plate so that the cooling fluid may exit the reservoir upward as the cooling fluid is converted into the gaseous state.

6. A power regeneration system according to claim 1, further comprising the circulation of the cooling fluid along the fluid flow loop occurring without a pump.

7. A power regeneration system according to claim 1, further comprising at least a part of the energy extracted from the cooling fluid by the turbine powering a fan in association with the condenser.

8. A power regeneration system according to claim 1, further comprising at least a part of the energy extracted from the cooling fluid by the turbine used to power electrical components of the information handling system.

9. A power regeneration system according to claim 1, further comprising the heated component of the information handling system configured to collect heat from one or more heat generating components of the information handling system.

10. An information handling system comprising:
    one or more processors communicatively coupled with associated memories;
    a thermosiphon disposed in a chamber and in thermal communication with the one or more processors, the thermosiphon configured to convert a cooling fluid from a liquid to a gaseous state as the cooling fluid absorbs heat from the one or more processors, the thermosiphon comprising a reservoir of the cooling fluid in the liquid state;
    a turbine disposed in the chamber with the thermosiphon and configured to extract energy from the cooling fluid in the gaseous state after it leaves the thermosiphon, the turbine located directly above and separate from the reservoir of the cooling fluid;
    a condenser configured to remove thermal energy from the cooling fluid after it leaves the turbine, the condenser converting the cooling fluid from a gaseous state to a liquid state as thermal energy is removed; and
    a fluid flow loop connecting the thermosiphon, the turbine, and the condenser in order so that the cooling fluid flows in a closed loop through the power regeneration system, wherein the turbine and the thermosiphon are vertically aligned and the condenser is offset from the turbine and thermosiphon.

11. An information handling system according to claim 10, wherein the condenser is a radiator.

12. An information handling system according to claim 10, further comprising a fan associated with the condenser and wherein the condenser is a radiator.

13. An information handling system according to claim 10, wherein a pressure drop of the cooling fluid as it passes through the turbine is small enough so that the fluid remains in the gaseous state until after it exits the turbine.

14. An information handling system according to claim 10, wherein the thermosiphon includes:
    a boiling plate in thermal communication with the one or more processors of the information handling system; and
    the reservoir of the cooling fluid disposed above the boiling plate so that the cooling fluid may exit the reservoir upward as the cooling fluid is converted into the gaseous state.

15. An information handling system according to claim 10, further comprising the circulation of the cooling fluid along the fluid flow loop occurring without a pump.

16. An information handling system according to claim 10, further comprising at least a part of the energy extracted from the cooling fluid by the turbine powering a fan in association with the condenser.

17. An information handling system according to claim 10, further comprising at least a part of the energy extracted from the cooling fluid by the turbine used to power electrical components of the information handling system.

18. An information handling system according to claim 14, further comprising the boiling plate configured to collect heat from one or more heat generating components of the information handling system.

19. A method for regenerating power in an information handling system, the method comprising:

circulating a cooling fluid through a fluid flow loop connecting a thermosiphon, a turbine, and a condenser, the turbine and the thermosiphon located in a chamber, wherein the turbine and the thermosiphon are vertically aligned and the condenser is offset from the turbine and thermosiphon;

a portion of the fluid flow loop connecting the turbine and the condenser being generally above the turbine;

removing heat from a heated component of the information handling system;

converting the cooling fluid from a liquid state to a gaseous state in the thermosiphon, the thermosiphon including a reservoir of the cooling fluid in the liquid state;

extracting energy from the cooling fluid in the gaseous state in the turbine, the turbine located directly above and separate from the reservoir of the cooling fluid;

removing thermal energy from the cooling fluid in the condenser;

converting the cooling fluid from a gaseous state to a liquid state as the thermal energy is removed from the cooling fluid; and returning the cooling fluid in the liquid state to the thermosiphon.

20. A method according to claim 19, further comprising using at least part of the energy extracted from the cooling fluid by the turbine to power one or more components of the information handling system.

* * * * *